United States Patent
McCollum et al.

(10) Patent No.: US 7,103,874 B2
(45) Date of Patent: *Sep. 5, 2006

(54) MODEL-BASED MANAGEMENT OF COMPUTER SYSTEMS AND DISTRIBUTED APPLICATIONS

(75) Inventors: Raymond W. McCollum, Redmond, WA (US); Radu R. Palanca, Seattle, WA (US); Jorg T. Pfenning, Redmond, WA (US); Alexander M. Sutton, Kirkland, WA (US); Mark R. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 187 days.

This patent is subject to a terminal disclaimer.

(21) Appl. No.: 10/692,216

(22) Filed: Oct. 23, 2003

(65) Prior Publication Data

US 2005/0091227 A1    Apr. 28, 2005

(51) Int. Cl.
G06F 9/44      (2006.01)
G06F 9/445     (2006.01)
G06F 15/177    (2006.01)
G06F 15/173    (2006.01)
G06F 13/00     (2006.01)

(52) U.S. Cl. .......... 717/121; 717/117; 717/176; 717/171; 709/220; 709/223; 709/224; 719/328

(58) Field of Classification Search ........ 717/100–104, 717/117, 120–127, 168–178; 709/220–226, 709/230; 719/310, 328, 313–317; 707/100, 707/200, 202, 203

See application file for complete search history.

(56) References Cited

U.S. PATENT DOCUMENTS

| | | | |
|---|---|---|---|
| 5,732,234 A | | 3/1998 | Vassiliadis et al. |
| 5,920,873 A | | 7/1999 | Van Huben et al. |
| 6,012,152 A | * | 1/2000 | Douik et al. .................. 714/26 |
| 6,067,548 A | | 5/2000 | Cheng |
| 6,085,030 A | | 7/2000 | Whitehead et al. |
| 6,138,168 A | * | 10/2000 | Kelly et al. ................. 719/310 |
| 6,219,666 B1 | | 4/2001 | Krishnaswamy et al. |
| 6,477,572 B1 | | 11/2002 | Elderton et al. |
| 6,553,387 B1 | | 4/2003 | Cabrera et al. |
| 6,598,060 B1 | | 7/2003 | Goldick |
| 6,684,231 B1 | | 1/2004 | Cabrera et al. |
| 2002/0019870 A1 | | 2/2002 | Chirashnya et al. |
| 2002/0049715 A1 | | 4/2002 | Serrano-Morales et al. |
| 2002/0059425 A1 | * | 5/2002 | Belfiore et al. ............. 709/226 |
| 2002/0133535 A1 | | 9/2002 | Lucovsky et al. |
| 2002/0147726 A1 | | 10/2002 | Yehia et al. |
| 2002/0174125 A1 | | 11/2002 | Lucovsky et al. |
| 2003/0135628 A1 | | 7/2003 | Fletcher et al. |
| 2003/0177109 A1 | | 9/2003 | Cabrera et al. |
| 2004/0031038 A1 | * | 2/2004 | Hugly et al. ................. 719/315 |
| 2004/0111638 A1 | | 6/2004 | Yadav et al. |

(Continued)

OTHER PUBLICATIONS

T. Berners-Lee, et al., Uniform Resource Identifiers (URI): Generic Syntax, Network Working Group, Aug. 1998, pp. 1-38.

(Continued)

*Primary Examiner*—Antony Nguyen-Ba
(74) *Attorney, Agent, or Firm*—Amin & Turocy, LLP

(57) ABSTRACT

Model-based application management architecture. A developer can describe an application or service in terms of its constituent components. Desired states can be described in terms of functionality, configuration, security, and performance. The description is employed at application installation to configure management services, which services help to ensure availability of the application through automatic management actions, such as configuration management, problem detection, diagnosis, and recovery.

39 Claims, 11 Drawing Sheets

U.S. PATENT DOCUMENTS

2004/0181541 A1* 9/2004 Groenendaal et al. ...... 707/100
2005/0097146 A1* 5/2005 Konstantinou et al. ..... 707/200
2005/0172306 A1* 8/2005 Agarwal et al. ............ 719/328

OTHER PUBLICATIONS

Along Lin, A New Model-Based Automated Diagnosis Algorithm, Feb. 1998, pp. 1-6.

Binoy Ravindran, Engineering Dynamic Real-Time Distributed Systems: Architecture, System Description Language, and Middleware, IEEE Transactions on Software Engineering, Jan. 2002, pp. 30-57, vol. 28, No. 1.

Timothy Roscoe, et al., InfoSpect: Using A Logic Language for System Health Monitoring in Distributed Systems, Proceedings of the SIGOPS European Workshop, Sep. 2002, pp. 1-7, Saint-Emillion, France.

F. Steimann, et al., Modela Based Diagnosis for Open Systems Fault Management, Al Communications, 1999.

Vijayan Sugumaran, et al., A Semantic-Based Approach to Component Retrieval, The Data Base for Advances in Information Systems, pp. 8-24, Summer 2003, vol. 34, No. 3.

International Search Report dated Oct. 14, 2005 mailed Dec. 2, 2005 for PCT Application Serial No. PCT/US04/22378, 6 pages.

International Search Report dated Feb. 15, 2005 mailed Mar. 4, 2005 for PCT Application Serial No. PCT/US04/22275, 5 pages.

Hewlett-Packard, Event Correlation Services Designer Overview & Features, viewed at http://www.openview.hp.com/products/ovocd/index.html, 1994-2003, 2 pages.

Hewlett-Packard, Event Correlation Services Designer's Guide, HP OpenView, pp. 1-236, Sep. 1998.

IBM Corporation, Rule Builder's Guide, Version 3.8, pp. 1-450, 2002.

Computer Associates International, Inc., Using the Performance Neugent Guide, 1999-2000, 99 pages.

Computer Associates International, Inc., Working with Neugents Guide, 1999, 35 pages.

F. Manola et al., RDF Primer W3C Working Draft Oct. 10, 2003, W3C, pp. 1-119.

J. Kunze, Functional Recommendations for Internet Resource Locators, http://www.ietf.org/rfc/rfc1736.txt, Feb. 1995, 10 pages.

K. Sollins, Functional Requirements for Uniform Resource Names, http://www.ietf.org/rfc/rfc1736.txt, Dec. 1994, 7 pages.

* cited by examiner

MODEL-BASED MANAGEMENT OF COMPUTER SYSTEMS AND DISTRIBUTED APPLICATIONS

CROSS-REFERENCE TO RELATED APPLICATIONS

This application is related to the following co-pending U.S. patent application Ser. No. 10/693,072, entitled "SCALABLE SYNCHRONOUS AND ASYNCHRONOUS PROCESSING OF RULE MONITORING" filed on Oct. 24, 2003; Ser. No. 10/692,660 entitled "RULES DEFINITION LANGUAGE" filed on Oct. 24, 2003; Ser. No. 10/693,588 entitled "USING URI'S TO IDENTIFY MULTIPLE INSTANCES WITH A COMMON SCHEMA" filed on Oct. 24, 2003; and, Ser. No. 10/692,432 entitled "USE OF ATTRIBUTION TO DESCRIBE MANAGEMENT INFORMATION" filed on Oct. 23, 2003.

TECHNICAL FIELD

This invention is related to computer systems, and more specifically, to management of computer systems and applications.

BACKGROUND OF THE INVENTION

Traditional systems management is largely ad-hoc. Application developers do not have a structured framework for managing their applications and achieving high reliability. The expected behaviors of applications are largely reverse engineered. Application developers do not have structured guidance and framework for how to think about managing their applications and achieving high reliability. Moreover, operating systems do not provide a holistic system for developers to leverage.

The complexity of systems is becoming too great for operators to understand. Significant time is spent tracking down dependencies and latent errors. Where instrumentation is not available, operators need to take a process dump, since this is the only way to determine what requests are executing and the current state.

Systems today do a poor job alerting users to potential and actual problems. Users cannot readily tell what applications are installed, and do not know if the system and applications have the right files and versions, are configured correctly for how they are used, are configured securely for the environment, and if they are operating optimally and not running out of resources. Moreover, applications are not easily debugged across multiple machines—there is no common application and transaction context.

Operators also cannot easily figure out application dependencies, whether files, components, configuration settings, security settings, or devices like storage area networks and routers. The system can neither warn users that a change may break other applications, nor use this information to help identify root cause.

Reactive monitoring is most common today where alerts let the user know that there was a failure, and not the cause of the problem. Advanced scripts and providers can provide more informative and actionable alerts, but lack an infrastructure for performing root cause analysis. Additional diagnostics are often needed for troubleshooting. However, a problem with reactive monitoring is that an alert is often too late—the application is already not available to users. Monitoring can help by triggering failover or taking a server offline with a load balancing device. However, the system should be sufficiently intelligent to detect potential problems in an application before the potential problems become failures.

Other problems are only detected by looking across multiple machines and clients. Examples include distributed intrusion detection and degradations in application performance. If administrators had at their disposal the capability to see a deviation from expected performance, been able to trace root cause to configuration changes as they capture snapshots, and solved the problem before users complained, many massive network performance problems and downtime could have been avoided.

Conventionally, problems with distributed applications are only determined by looking at historical data or trends from a user perspective. Administrators often do not know if their replication backlog is a problem or not, and need to run the service first and log operational metrics to establish a baseline with warning and critical thresholds.

What is needed is an improved mechanism for management infrastructure.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a model-based management system that provides an innovative framework that enables a developer to describe an application or service in terms of its components. The developer can describe desired states of the application or service in terms of functionality, configuration, security, and performance. This description or model is provided with the application and used by the system at installation to configure the management services. A computer system employs the developer's description at installation to configure management services. The management services help ensure availability of the application through automatic management actions, such as configuration management, problem detection, diagnosis, and recovery. The model also describes common tasks that the administrator may perform.

The model-based management architecture comprises the following parts: models, for the components making up an application, e.g., health states and recovery, configuration settings, and admin tasks; attribution within the source code to indicate instrumentation and logic for monitoring; one or more manifests that ships with the application, which manifest(s) that contain information from the models and source code attribution in a machine-readable form for use by the management system services; a management system comprised of multiple services that are configured by information within the application manifest; and, administrative tasks for an application that are defined within the manifest.

The system component of the model-based management architecture consists of the services necessary to ensure availability of an application. The system uses the desired states expressed in the manifest and modified by the administrator to perform the following: installation that verifies dependencies and installs only the necessary files, settings, and security; event subscriptions that subscribe to events and forwards them as specified; polled instrumentation that periodically collects instrumentation and counters; scheduled tasks that perform automatic management tasks; role-based access that restricts access to program functions; a monitoring function that detects problems, diagnoses root causes, takes corrective actions, and notifies the system administrator when intervention is necessary; and, central configuration for customizing policy for the above, and for applying to many machines.

In another aspect thereof, the model-based management system is applied to a distributed network of hardware and software. Components of local and remote applications, as well as local and remote machines and services are described and managed accordingly.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
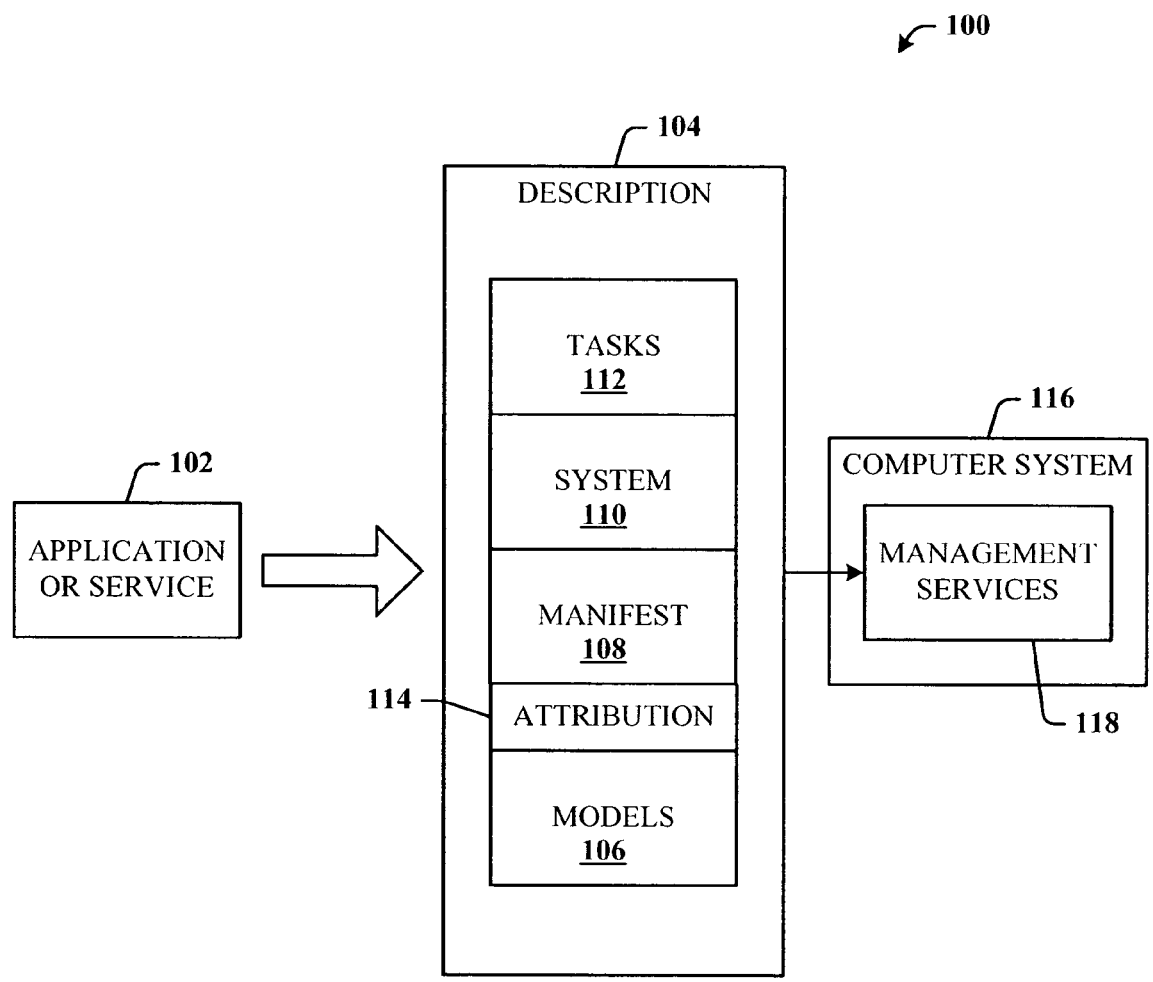
FIG. 1 illustrates architecture that facilitates model-based management of applications in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated architecture 100 that facilitates model-based management of applications or services in accordance with the present invention. The model-based management approach allows a developer to describe an application or service 102 in terms of its constituent components and desired states in terms of functionality, configuration, security, and performance. Thus, an application or service description 104 facilitates describing the application or service 102 in terms of one or more manageable components, including at least a models component 106, manifest component 108, system component 110, and tasks component 112. The model-based management system 100 utilizes an attribution component 114 to facilitate attribution of the source code from the model component 106 to the manifest component 108.

A computer system 116 uses the application or service description 104 at installation of the application 102 to configure management services 118 associated with the computer operating system. The management services 118 then help ensure availability of the application or service 102 through automatic management actions such as configuration management, problem detection, diagnosis, and recovery. The model 106 also describes common tasks that the administrator may perform. The model-based management architecture 100 facilitates a lower total cost of ownership, and is used across the application lifecycle from development, to deployment, operations, and business analysis. Generally, a developer begins by creating one or more models of the application or service in terms of how the application works, its constituent components, the desired health states that the developer defines and chooses to monitor, configuration aspects at least with respect to how it will be installed and what settings the application or service will require and, administrative tasks and the scheduling thereof. The source code of the model is then attributed (or tagged) at specific areas for manifesting.

The models are rolled up into instrumentation manifests. The models tend to be in the form of text documents, spreadsheets documents, etc., structured documents that are either transformed through codes, scripts, tools, or manually into the manifest that tend to be more XML schemas, and further machine processed and machine read. That is to say the models documents are more human readable and the manifests are more machine readable. The manifests are then used to facilitate system management.

The attribution subcomponent 114 is associated with source code attribution. Attribution is used to express management information along with the code to which it pertains. Without attribution, two separate pieces of code would need to be written—one for normal application processing and one to expose it to management. Attribution within the source code is used to describe which parts of the code (called probes) should be used to determine and/or correct health, as well as specify when to execute monitoring rules. Probes can be exposed from components that access existing operating system APIs (Application Program Interfaces) or from components loaded inside running applications or services. In both cases, the developer adds attribution to indicate what subset of the types within the components should be exposed and how they should be identified. Probes are identified using URIs (Uniform Resource Identifiers) within an administrator namespace. At runtime, a probe is retrieved by identifying it from within a catalog of all probes on the computer, and following the associated information about the probe.

Source code attribution can also provide instructions to the monitoring service, for example, to attribute functions that should be used as monitoring rules and loaded at startup, polled periodically, run on an event, etc. This attribution can be automatically processed and put in the manifest the same way as the instrumentation. Thus, attribution is not just instrumentation, but for other management purposes as well. Attribution can also be used to support administrative tasks and/or corrective actions.

Figure 2:
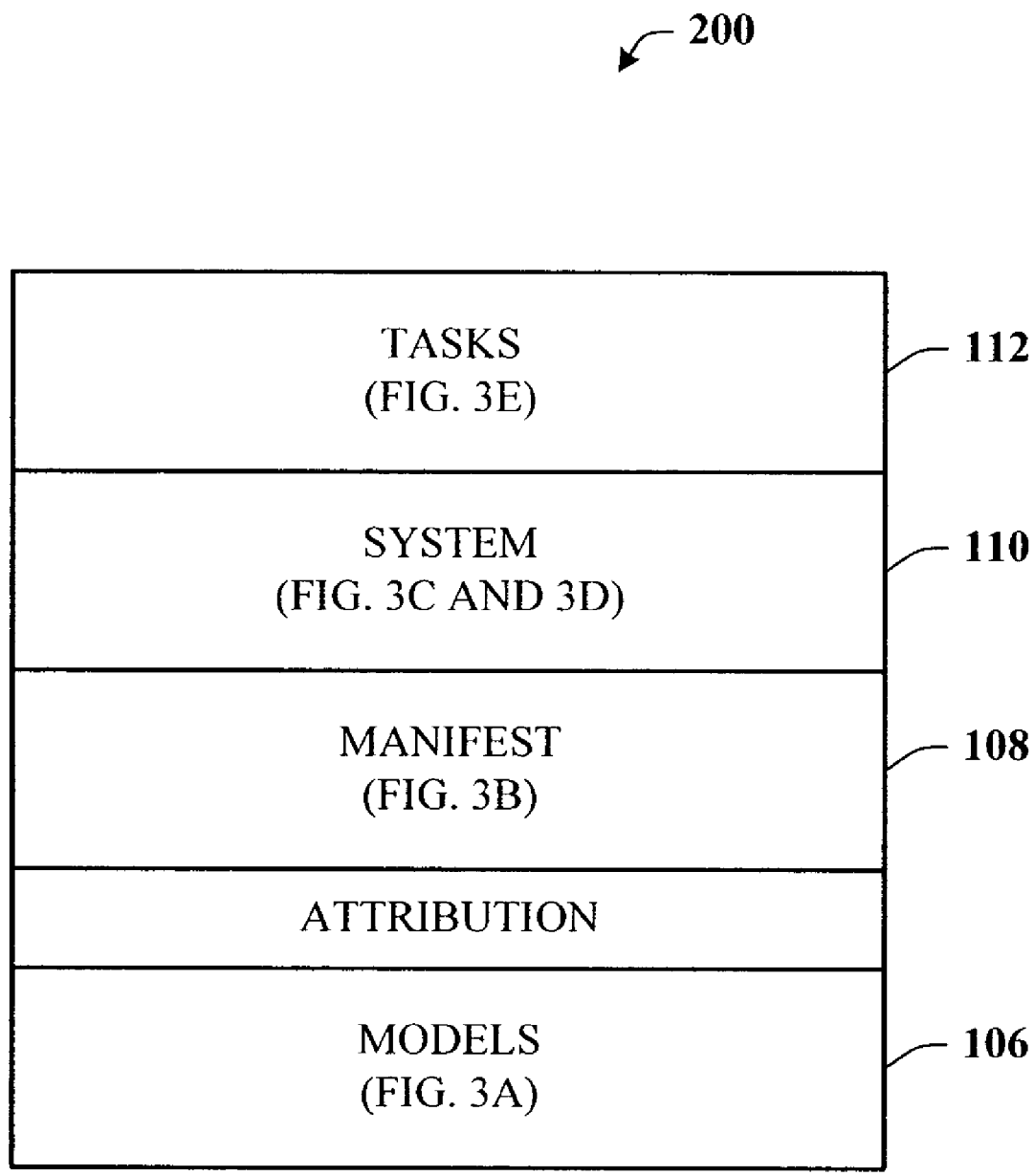
FIG. 2 illustrates a drawing map related to describing principal components of the model-based management architecture.

Referring now to FIG. 2, there is illustrated a drawing map 200 related to describing principal components of the model-based management architecture 100. The architecture includes the models component 106 that is described in relation to FIG. 3A, the manifest component 108 that is described in relation to FIG. 3B, the system component 110 that is described in relation to FIG. 3C and FIG. 3D, and the tasks component 112 that is described in relation to FIG. 3E. Attribution has already been described, and will be addressed throughout the specification.

Figure 3B:
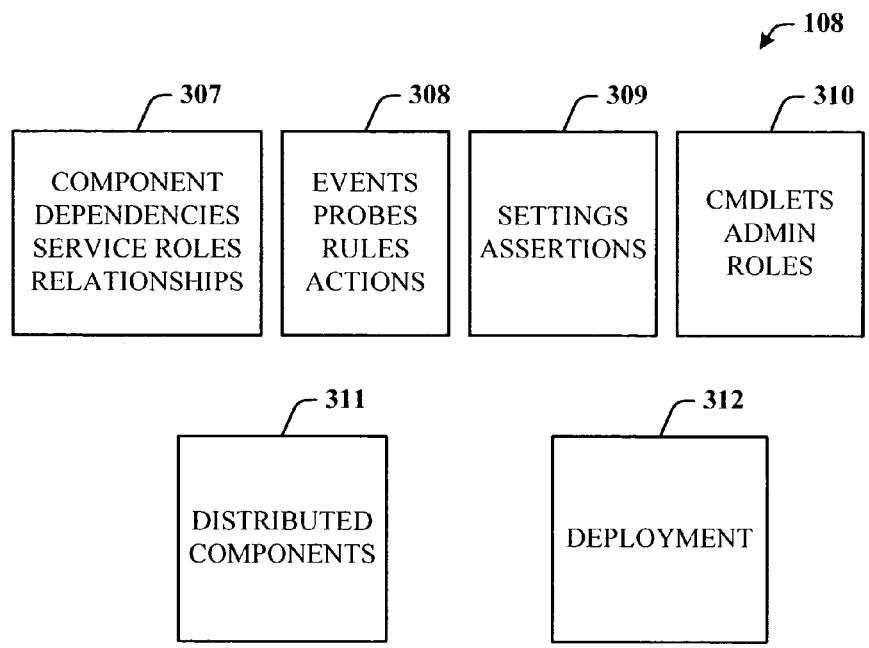
FIG. 3B illustrates blocks associated with the manifest component of the model-based management architecture of the present invention.
Figure 3A:
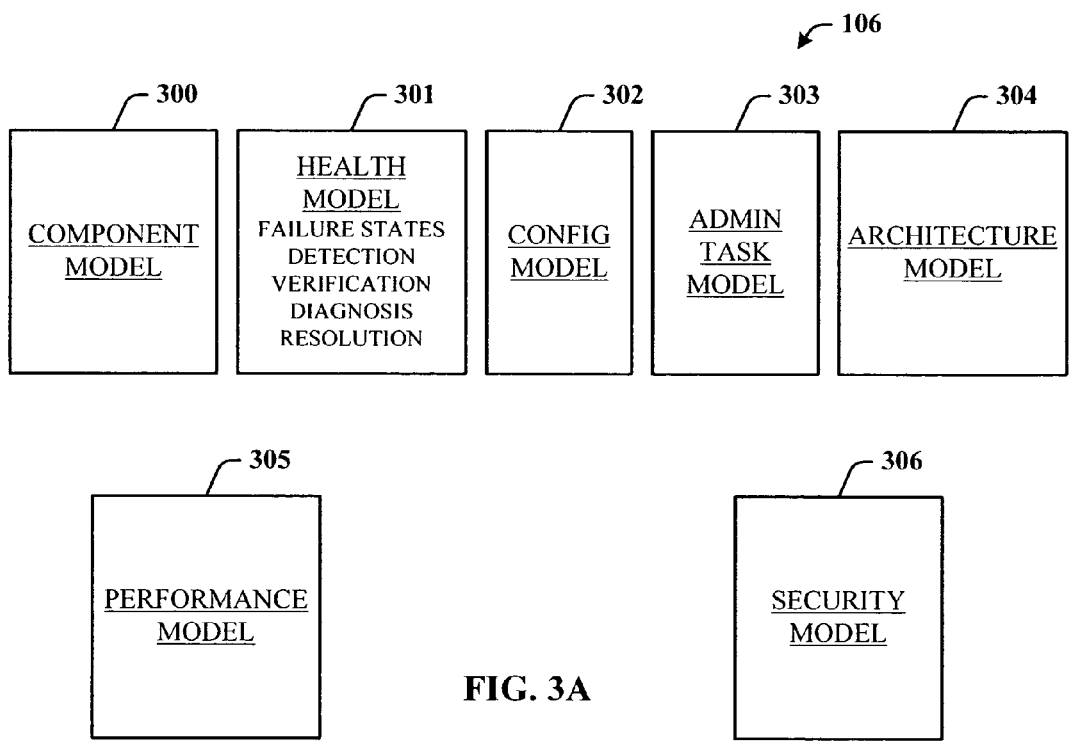
FIG. 3A illustrates blocks associated with the models component of the model-based management architecture of the present invention.

Referring now to FIG. 3A, there are illustrated blocks associated with the models component 106 of the model-based management architecture of the present invention. Models are developed for the components making up an application, health states and recovery, configuration settings, and administrative tasks.

In support thereof, there is a component model subcomponent 300 for modeling any and all components of the system (and relationships, dependencies and service roles associated therewith). The component model 300 describes the files, configuration, different ways the application can be installed, and more.

A health model subcomponent 301 can be developed to describe the various failure states, and the way that the application or service could fail. The health model 301 describes the steps that would need to be taken to automate the health features. The health model 301 represents at least the failure states, detection the states, verification, diagnosis, and resolution of the system states. The health states can be described in terms of what criteria must be met to be considered completely healthy, to completely fail and any intermediate states, e.g., degraded performance, partially working, some of the customer functionality is working, and is the application or service delivering the expected level of service. Health also considers that functionality could be fine, but performance is substandard indicating that the application or service is not healthy.

A configuration model subcomponent 302 is associated with modeling the system configuration. The configuration model 302 is used to describe the application settings, user controls, default values, various restrictions, etc. An administrative task model subcomponent 303 is associated with modeling administrative tasks, and includes the actions a user can take upon a system, such as start, stop, add user, add database, and corrective actions that can be called from the health model 301. The model 302 enumerates all that can be done with the application or service. An architecture model 304 is used to describe distributed environments and associated deployment, normally associated with, for example, a large network of clients having the same or similar hardware and software settings and configuration, and distributed databases. Thus, a local application may be dependent on a remote disk array. At deployment, the disk array needs to be instanced at the deployment level with a manifest and using URIs. Since the URI is machine independent, distributed systems can also obtain the benefits of the model-based management system of the present invention. A performance model 305 can be developed to describe the way in which the developer wishes to use metrics for monitoring performance of the application or service. This is closely related to health of the system. A security model 306 can be generated that describes the types of security associated with the application or service.

Note that the number of models provided herein is not exhaustive, since the developer can provide many different models for managing various aspects of the application or service.

The subject invention can employ various artificial intelligence based schemes for carrying out various aspects thereof. For example, with respect to models, a process for determining what models can be utilized for a given instance or implementation can be facilitated via an automatic classification system and process. Moreover, such classifiers can be used to build operational profiles of the system that start to detect system patterns, and learn what is a good state, a bad state and, successful and unsuccessful transactions. This information can then be fed back into the corresponding model and used as an updated model for a follow-on system. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier(s) is used to automatically determine according to a predetermined criteria, for example, what initial settings to use for a given implementation, and then adjusting the settings over time as the system matures and experiences various loading conditions with respect to data, number of installed applications, and the number of nodes with which to interact. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)$=confidence(class). In the case of management systems, for example, attributes are system parameters of desired states, and the classes are categories or areas of interest (e.g., all drives, all native process). Classifiers can also be employed to capture and analyze transaction logs, look for patterns, and diagnose a system by looking for successful and unsuccessful patterns.

Configuration health involves, for example, changing a queue size from five to ten, and determining what impact the change can have on the application, service, or system. The same applies for security and performance, where a classifier can be employed to monitor performance counters and make system changes accordingly to optimize performance. Security can also be monitored and analyzed for patterns, the impact of which can be used to suggest or alter security polices. Thus, it is to be appreciated that health is a broad concept that can be applied to many areas of the system. In a system-wide scope, performance can be good, but security could be poor. Thus, a holistic view that crosses many disciplines of the system, as provided by the present invention, is advantageous.

The desired states of the administrator can be expressed in the code, which is surfaced in the manifest and passed for monitoring by the monitoring service. The system can, based upon instructions in the manifest, monitor the application or service and alert the administrator when the application or service does not meet the performance, and based on the instructions, take corrective actions. For example, where a test setting for e-mail is not maintained, but falls below a threshold for a period of time, another machine can be added until the load subsides, and the network traffic can also be used as a trigger increasing the number of resources to handle the given load. A goal is automate as much a possible so that the administrator is involved only when manual action is required.

The model-based management system of the present invention is composable. It is component based, with a component comprising most anything. Thus, the system can be reduced to its lowest manageable piece and composed back up. In a database, for example, there is the application, with instances, the database, tables, and stored procedures, and can be reduced as low as a single file. Consider a 401k application. The 401k application can depend on a database, a web sever, and the customer's own business logic, down to a database that depends on the operating system and associated. In accordance with novel aspects of the present invention, it is desirable to manage and report at the various levels. Applications are described through relationships between components. These relationships can express how an individual application is assembled (e.g., SQL server contains a service, instances, and databases), platform requirements (e.g., operating system and other applications), and communication to other components (the web server connecting to the SQL server). A single administrator may care about a database and a single machine, whereas a finance administrator may care about the 401k application, and the CIO cares about all of the applications and machines. The models, reporting, and desires states should process everything such that individual metrics can be referenced to determine if the system is doing what is expected.

All models are tied into a URI namespace, providing a standard way of navigating the system, enumerating all components installed, and asking the component what it provides, what is considered healthy, what events does it have, what error events occurred in the last day or hours, what configuration settings are included, what changes occurred in the last hour, etc.

Referring now to FIG. 3B, there are illustrated blocks associated with the manifest component 108 of the model-based management architecture of the present invention. The manifest that ships with the application contains information from the models and source code attribution in a machine-readable form for use by management system services. Administrative tasks for an application are defined within the manifest. There can be a number of manifests generated that correspond to the models, including the following; a first manifest subcomponent 307 associated with component dependencies, relationships between the components, and service roles; a second manifest subcomponent 308 associated with events, probes, rules, and actions; a third manifest subcomponent 309 associated with settings and assertions; a fourth manifest subcomponent 310 associated with commands (i.e., cmdlets) and administrative roles; a fifth manifest subcomponent 311 associated with distributed environments; and a sixth manifest subcomponent 312 associated with deployment.

The manifest is the "bridge" between developer and, the operations team and the administrator, and is created automatically with a tool that sweeps the models for the attributed code. The component manifest 307 is used by a setup engine to determine how to install the application or service. It describes the logical components, files, where the files should be installed, and configuration settings (or any settings). Dependencies are what need to be defined before installation, and include various roles, so that the application can be installed in different modes, with varying degrees of security, and different operational profiles. The component manifest 307 makes it easier for the user and/or the system to know what to do manually and automatically. Manifest granularity can get down to one manifest per component.

Conventionally, many more files are installed than what are actually needed. The manifest allows installing only those files that are needed. This improves at least performance and security. Software dependencies are defined in the manifest 307. At the application level, the dependencies can be specific to a single machine and define component relationships and the hardware resources. A computer can be described by a manifest, for example, the application should be deployed on a dual-processor machine of a specific manufacturer, or interface to a 4-processor machine. This manifest 307 describes the processor, memory, drives, etc., to the level of hardware granularity needed for the implementation. Thus, management can be more proactive then reactive, as in conventional systems. A hard disk failure can be determined to be caused by thermal failure, for example, where the system temperature is monitored over time, and the power supply rail voltages are monitored, but found to be sufficient.

The health model 301 is used to spawn the health manifest 308. The health manifest 308 is populated from the health model 301 using attribution and other tools. Events are not called out in the model 301, but in a resource file. A tool sweeps the resource files and attributed source code, and populates the health manifest 308. Failure states can be detected by watching for a predefined sequence of events or monitoring performance counter thresholds. Instructions can be provided to the system as to how to address such failure states. The health model is transformed into rules. The health manifest 308 includes ruletype event sequences with parameters such as event1, event2, time3, etc.

The configuration model 302 describes what settings are included and is transformed into the settings and assertions manifest 309 that provides instruction schema for the system to create the settings when the component is installed.

The administrative task model 303 is transformed into actions via the cmdlets and administration roles manifest 310. For example, if a data backup is required, the cmdlet is the actual code or URI used to facilitate the backup task. Where numerous administration tasks need to be performed, the manifest 310 provides the URI path to the those commands and perhaps to the code. The cmdlet can be processed through assertion on the code or may require external code. The administration role is another abstraction supporting, for example, multiple classes of users that manage this application or service, and the level of control they each can exercise. This associates with role-based access. Metadata is required that describes the roles of the various users and their allowed capabilities. Roles cross all aspects of the system-who is allowed to install, who can change monitoring, who can look at health, who can resolve alerts, who can take these various actions, etc.

The task model 303 defines what the developer thinks the administrator should do, as expressed in the manifest 310, and customized by the operations teams for their environment. These customizations can be done at the class level and instance level. Changes can be made in the manifest at the class level, at the instance level, and changes can be made directly at runtime. A very powerful feature of the disclosed model-based management architecture is that capabilities can first be described at the class level, whereas at runtime, access is to the instance space.

The architecture model 304 surfaces the distributed components manifest 311 and the deployment manifest 312. Network connections between machines, hardware requirements, are covered here, for example. The deployment manifest 312 supports at least applications comprising web servers, middle tier servers, and database servers, and includes frontend/backend applications, network connectivity between the two applications, and describes the relationships between individual nodes. Deployment time creates instances of those described in the overall architecture model 304.

The performance and security models (305 and 306) each support corresponding manifests (not shown) that describe those related functions and operations.

Returning to the employment of machine-based learning, a classifier can be used to select and dynamically generate manifests of selected portions of the model code based on requirements during, for example, first deployment. Default models can be automatically generated using more attribution or less attribution. Over time, as system operational information becomes available, this information can be analyzed such that the level of granularity of the manifest can be adjusted to, for example, more closely monitor the system in specific areas based on the latest data trends and logs. The updated manifest is then regenerated and employed as needed to more closely monitor the application or service.

If a manifest describes the default installation or recommended best practices from the manufacturer, an administrator may want to change things. For example, with respect to health rules the administrator may want to change a threshold from thirty to forty, or install components, or override a security policy. This can be done by creating a customized version of the manifest to override the manifest bundled by the manufacturer. A different version can be detected during installation, allowing a user the option to select the default manifest or the custom manifest. Alternatively, there can be a separate file the system reads that lists the overrides, which are then displayed for selection by the user to be applied to the default manifest or during installation such that the default settings are overridden.

With respect to the distributed applications, the administrator can more generally stipulate that he or she wants three of these, four of that, and six of those, all wired in this configuration. The administrator may customize the deployment manifest 312 accordingly for the given environment.

Figure 3C:
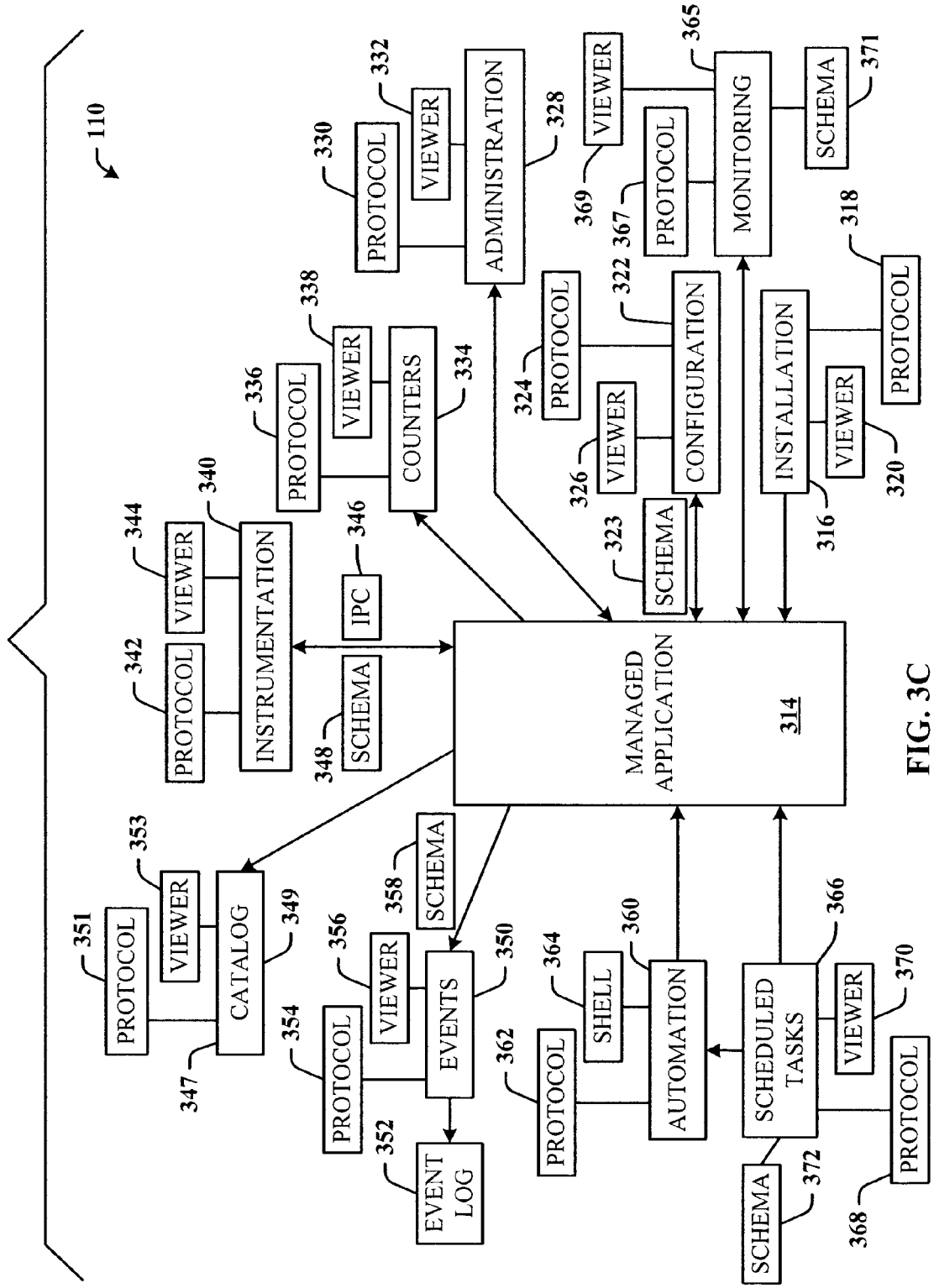
FIG. 3C illustrates a block diagram of core system APIs of the system component utilized for managing an application or service in accordance with the model-based management architecture of the present invention.

Referring now to FIG. 3C, there is illustrated a block diagram of core system APIs of the system component 110 utilized for managing an application or service 314 in accordance with the model-based management architecture of the present invention. The system component 110 includes the application or service 314 that is to be managed in accordance with the present invention. The system 110 includes a number of APIs in cooperative communication for facilitating the model-based management. The system 110 is comprised of multiple services that are configured by information within an application manifest (described with respect to FIG. 3B).

The system 110 consists of the services necessary to ensure availability of an application and uses the desired states expressed in the manifest component 108 and modified by the administrator to perform the following: installation to verify dependencies and install only the necessary files, settings, and security; event subscriptions, to subscribe to events and to forward as specified; polled instrumentation to periodically collect instrumentation and counters; and, synthetic transactions or simulating user transactions. One of the best ways to determine if an application is available and performing as expected (the desired state) is for the monitoring system to use the application as if it were a user. This is active monitoring. A potential second way is active monitoring of real user transactions, and reporting aggregate data up to the system for analysis. These steps close the loop and show that internal application data is not sufficient. Model-based management also works outside the application.

The system 110 uses the desired states expressed in the manifest component 108 to also perform task scheduling for automatic task management; role-based access to restrict access to program functions; monitoring to detect problems, diagnose root causes, take corrective actions, and notify the system administrator when intervention is necessary; and, central configuration to customize policy for the above and apply to many machines.

There is provided an installation API 316 in communication with the application 314 to facilitate installation of the application, application updates, and patches. The installation API 316 takes the manifest assemblies via the code and instantiates the assemblies, by instructing the system to install this component, this manifest, and this version, on this machine. The installation API 316 has associated therewith a protocol 318 and a viewer 320. The protocol 318 facilitates communicating API-related data with other components of the system 110. The viewer 320 displays data related to the installation API 316. The installation API 316 not only facilitates installation on a single machine, but also for distributed applications or services involving both local and remote systems, as well as for hardware provisioning and abstraction. For a distributed data center environment, it is important to be able to abstract the hardware system generally, and to a finer granularity, to a specific machine abstraction. A protocol, as contemplated herein with respect to an API, is the rules that govern the transmission and receipt of that API-related data. The viewer 320, as understood in this description, is a program that displays data related to the API, here the installation API 316. The API data includes but is not limited to sound files, video files, for example, and other types of data files.

The system 110 includes a configuration API 322 in communication with the application 314 to facilitate configuring the application 314. The configuration API 322 has associated therewith a schema 323, a protocol 324, and a viewer 326. The schema 323 that defines the structure and contents of the data passed between the API 322 and the application 314. The protocol 324 facilitates communicating API-related data with other components of the system 110. The viewer 326 displays data related to the configuration API 322.

There is also included an administration API 328 that facilitates many-to-one administration for distributed environments. The API 328 communicates with the managed application 314 and also remote systems (not shown). The API 328 has an associated protocol 330 and a viewer 332.

The system 110 includes a performance counter API 334 in communication with the application 314 to facilitate tracking counter variables that are used in managing the application 314. The counter API 334 has associated therewith a protocol 336 and a viewer 338. The protocol 336 facilitates communicating API-related data with other components of the system 110. The viewer 338 displays data related to the counter API 334. Performance counters are exposed by the application 314 and publishes the counters through the viewer 338.

There is provided an instrumentation API 340 in communication with the application 314 to facilitate configuring instrumentation and the passing of instrumentation data with the application 314. The instrumentation API 340 has associated therewith a protocol 342 and a viewer 344 through which the instrumentation is exposed. The protocol 342 facilitates communicating API-related data with other components of the system 110. The viewer 344 displays data related to the instrumentation API 340. The instrumentation API 340 communicates with the managed application 314 via IPC (InterProcess Communication) 346. IPC is the automatic exchange of data between one program and another, either within the same computer or over a network. One example of an IPC function is performed when a user manually cuts and pastes data from one file to another using a clipboard. The counters are always published via shared memory, while the instrumentation is delivered on demand. The instrumentation API 340 also includes a schema 348 that describes the surface of the instrumentation classes in manner similar to an events schema. There may also be included an instrumentation log (not shown); however, many administrators prefer to utilize an event log.

The system 110 includes a catalog 347 that is the store that keeps track of and caches component and mode information. This mode information comes from the manifests at install and, parts are dynamic and updated at runtime. The catalog 347 includes a catalog API and provides access to events, counters, instrumentation, and configuration data, to name just a few types of the data stored therein. Access to the catalog 347 is facilitated by a protocol 351 and viewer 353. A central configuration database contains a rolled up or aggregate view of the catalog across multiple managed nodes.

The system 110 includes an events API 350 in communication with the application or service 314 to facilitate implementing and tracking events that are used in managing the application 314. The events API 350 interfaces to an event log 352 that serves as a store for all events that occur. The events API 350 has associated therewith a protocol 354 and a viewer 356. The protocol 354 facilitates communicating API-related data with other components of the system 110. The viewer 356 displays data related to the events API 350. Communications with the application 314 is in accordance with an events schema 358 that defines the structure and contents of the data passed therebetween. The events are published as they are described or happen. The schema describes the surface of the event.

The system 110 includes an automation API 360 in communication with the application 314 to facilitate automating procedures that might normally be done interactively with the application 314. The automation API 360 has associated therewith a protocol 362 and a shell 364. The protocol 362 facilitates communicating API-related data with other components of the system 110. The shell 364 provides a user interface to the automation API 360 to facilitate user interaction therewith for entering and displaying data related to the automation processes and user control of the automation processes.

The system 110 further includes a scheduled tasks API 366 in communication with both the application 314 and the automation API 366. The scheduled tasks API 366 facilitates scheduling jobs or programs for at least the automation API 360 and the managed application 314. It maintains a list of jobs to be run and allocates resources accordingly. The scheduled tasks API 366 has associated therewith a protocol 368 and a viewer 370. The protocol 368 facilitates communicating API-related data with other components of the system 110. The viewer 370 displays data related to the scheduled tasks API 366. A task schema 372 defines the structure and contents of the data passed between the tasks API and other components.

Automation and tasks data is received from the task and cmdlets models. These features can be automated through the management shell either locally or remotely. The scheduling system can run these, e.g., a backup at 3 AM.

Figure 3D:
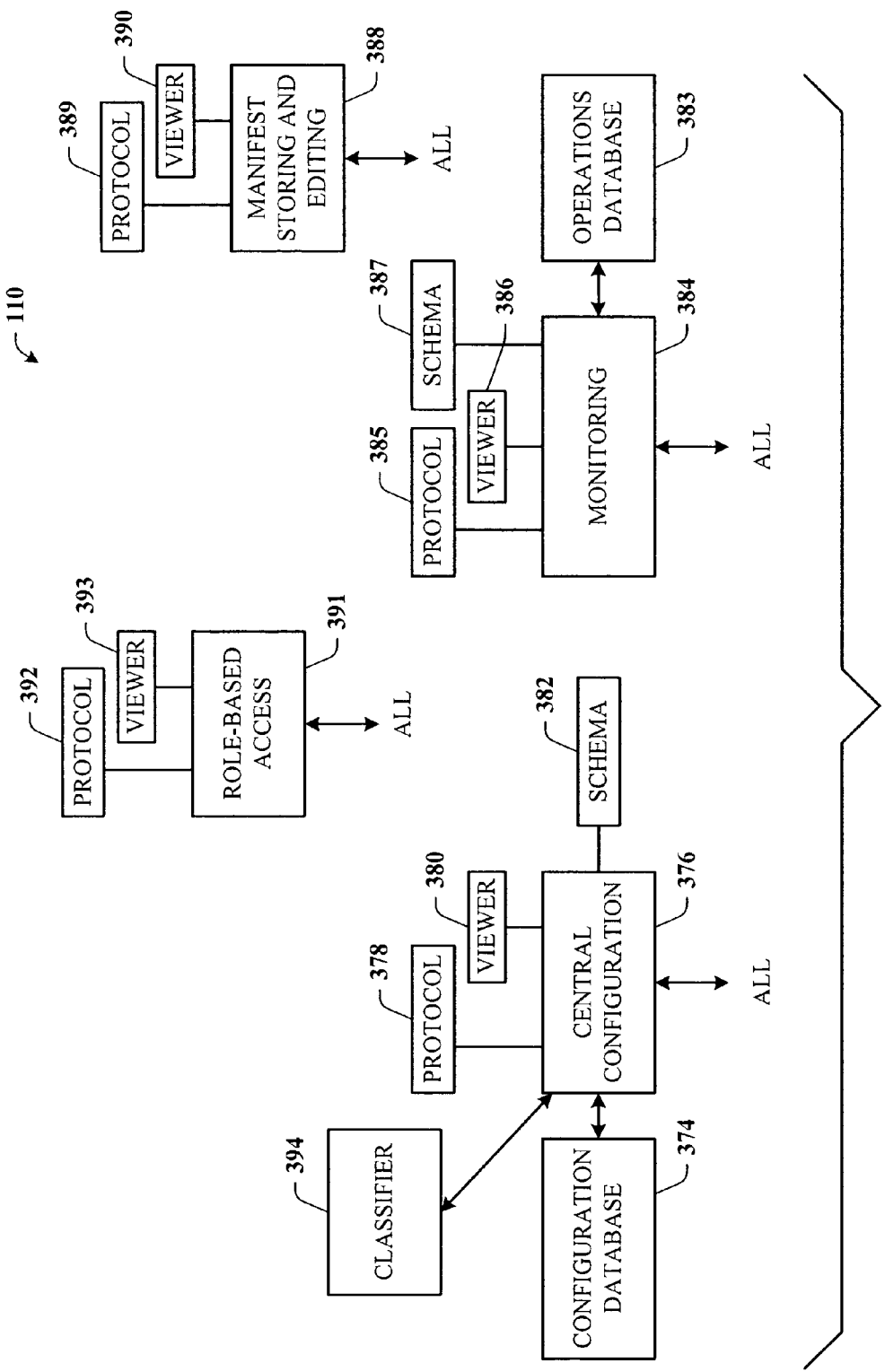
FIG. 3D illustrates a block diagram of management-related APIs of the system component of the model-based management architecture of the present invention.

It is to be appreciated that components described in FIG. 3C can represent those of a local implementation, while the components of FIG. 3D can represent those associated with a distributed implementation such that analysis occurs across many machines and software systems. Thus, in a distributed implementation, the components of FIG. 3D communicate with at least one of the local systems of FIG. 3C, but typically a plurality of such local implementations in a wired and/or wireless regime. In the local implementation, the system 110 can also include any or all of the components of FIG. 3D, including a local monitoring service API 365. The local monitoring service API 365 also includes a protocol 367, a viewer 369, and schema 371, each of which facilitates functionality similar to such components of other APIs. In a distribute implementation, the local monitoring service 365 then passes monitoring information to the distributed monitoring service, described hereinbelow.

Referring now to FIG. 3D, there is illustrated a block diagram of management-related APIs of the system component 110 of the model-based management architecture of the present invention. There is provided a configuration database subcomponent 374 to which access and control is provided via a central configuration API 376. The central configuration API 376 interfaces with all subcomponents of the system 110, and has associated therewith a protocol 378 and a viewer 380 for communication and interaction and, a schema component 382 that describes the shape of the configuration settings and attributes, such as assertions and default values. The protocol 378 facilitates communicating API-related data with other components of the system 110.

There is also provided an operations database subcomponent 383 that serves as a repository for operations-related data of the management system, e.g., reporting, current state, and historical data. A monitoring API 384 interfaces to the operations database 383 and all subcomponents of the model-based management system, and further has associated therewith a protocol 385, a viewer 386, and a schema 387. The protocol 385 facilitates communicating API-related data with other components of the system 110. The viewer 386 displays data related to the monitoring API 384. The schema 387 provides the definition for the entire operations database 383 at least with respect to the structure and type of contents that each data element within the structure can contain.

Central configuration can touch all of the APIs, and is used by the administrator to set configuration details, which can include details for the distributed application scenario, such as on what machines should the application be installed. Configuration also includes monitoring configuration. For example, all machines must exhibit no less than 80% CPU utilization for five minutes. Thus, the monitoring system uses the configuration system. Monitoring is how the administrator ensures via the management system that the application is behaving, configured, and installed per the model. It also includes ensuring expected functionality, the desired amount of security, performing properly, and delivery the data as expected for the users. Thus, monitoring crosses all of those domains. The general process is to install, configure, run tasks on demand, consume events, provide instrumentation, configuration, and store data and results. The health manifest provides the working instructions to the monitoring system in the form of rules that are the instructions to the monitoring system. In general, the manifest contains the runtime instructions, and the runtime implements the desired state.

The monitoring service is both a local service, as well as a central or distributed mechanism. For a distributed implementation, health includes that of the local machine as well as the relationships between the local and remote machines. For example, given a cluster of ten machines, as long as six are functioning properly, the system is considered to be healthy. However, if no more than five machines are running, the system health status degrades to a cautionary state. If no more than four machines are running, the system health can be considered in a failure state. Hardware abstraction facilitates bringing one or more backup systems or applications/services online if one or more cluster machines fail or go offline. Thus, a pool of idle or shared resources can be controlled based upon instructions. This feature is particularly useful in a data center environment. Automated actions can be implemented to ensure that the system maintains optimum or at least a minimum functionality.

One aspect of the model-based management architecture allows a developer to author a large number of rules that express criteria that must be met for a system to be considered healthy. The monitoring API 384 includes a rules runtime engine that facilitates implicit concurrent processing of the rules. The rules engine receives input instructions that express the rules as an intermediate form, which rules are expressed using a rules definition language (RDL). The rules engine also receives configuration data from the configuration database 374 that is used to instantiate the rule code. A translator reads the input instructions and transforms them into a parallel execution form. The runtime engine reads the translated instructions and facilitates parallel execution. The rule code is instantiated by loading the configuration data into the runtime engine that specifies which rules to run, as well as the parameters required to run the rule. Rule parameters can be changed at runtime, such as enabling rules that have a heavy system impact only when a problem has been detected. Thus, the rules are dynamic, as well as thresholds, that also can be changed accordingly. The monitoring API 384 also connects to all subcomponents of the system 110.

There is also provided a manifest storing and editing service 388 for use by the administrator. The manifest service 388 has associated therewith a protocol 389 and a viewer 390 to expose these manifest functions to the administrator. The manifest service 388 feeds the manifests to the administrator via the protocol 389 and viewer 390, allowing the administrator to view and change the manifests before installation. The manifest service 388 also facilitates versioning of the manifests according to updates and customizations.

There is also provided a role-based access API 391 that interfaces to all subcomponents of the model-based management system, and further has associated therewith a protocol 392 and a viewer 393. The protocol 392 facilitates communicating API-related data with other components of the system 110. The viewer 393 displays data related to the role-based API 391. This API 391 is illustrated at a level above the monitoring and configuration components to provide overall administration of access to the various components and aspects of the model-based management system. It is not necessary that the role-based access API 391 include the protocol 392 and a viewer 393, since these functions can be facilitated by other components of the system 110.

The system also includes the classifier 394 for machine-based learning and control. As indicated hereinabove, the classifier 394 can be employed in many ways to enhance system performance and health, to name just a few. To facilitate machine-based learning, the classifier 394 interfaces with central configuration service 376 such that all components of the system may be accessed and its data used.

Figure 3E:
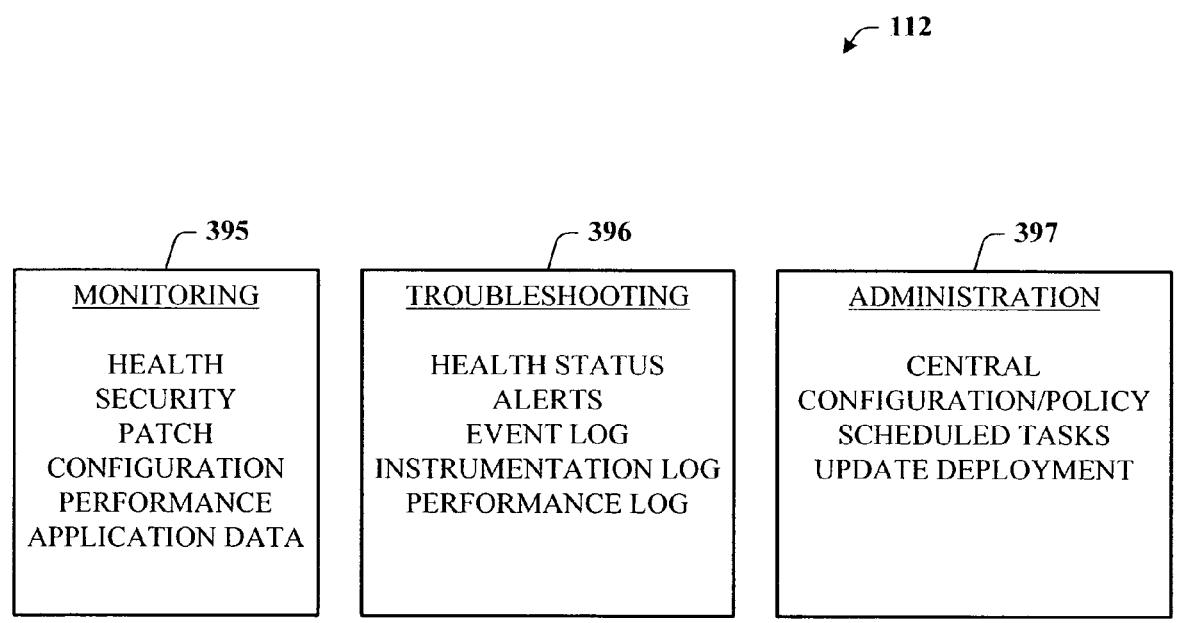
FIG. 3E illustrates subcomponents of the tasks component of the model-based management architecture of the present invention.

Referring now to FIG. 3E, there is illustrated principal subcomponents of the tasks component 112 of the model-based management architecture of the present invention. The tasks are described through the administration task model. The tasks fall into three subcomponents: a monitoring subcomponent 395, a troubleshooting subcomponent 396, and an administration subcomponent 397.

The tasks for the monitoring subcomponent 395 include overseeing health, security, patches, configuration, performance, and application data. The tasks for the troubleshooting subcomponent 396 include diagnosing a health state, processing alerts, and updating event, instrumentation, and performance logs. The tasks of the administration subcomponent 397 include central configuration/policy, scheduling, and update deployment. Administration includes not only management of a single system by also managing many machines, applications, and systems, policies, backup times, changes, and updates, for example.

URIs are employed in the model-based management architecture to uniquely identify abstract or physical resources or collections of resources. A schema for a resource can be identified by the URI with a placeholder for the resource. The URI with placeholder is called a URI template. The catalog of the system relies on URI templates to describe instrumentation without referring to specific instances. URI templates allow probes to be identified and their characteristics understood without actually retrieving the probe for a particular instance. Protecting the capability to predefine instrumentation separately from instances makes the deployment and authoring of rules easier and the associated operating system manageable.

The model-based management framework employs the RDL to enable defining of rules for the purpose of monitoring the availability of software and hardware. Rules written in RDL are executed by the runtime engine as part of the monitoring service. The purpose of the RDL is to test assertions, enforce constraints using runtime information, make inferences, perform correlation, and communicate results of dynamic tests to other components. The RDL defines the rule type (i.e., class) while a separate XML (eXtensible Markup Language) document is used to create instances of the rule type by specifying the parameter values necessary for its instantiation. There is a schema for describing the sequence of steps the system should take for problem detection, diagnosis, resolution, verification, and alerting. This is what is described in the model, expressed in the manifest, and executed/managed by the monitoring system.

The model-based management framework employs events and update values of performance counters to indicate a health model (or status) of services, and tests or synthetic transaction, as indicated earlier. The health model 301 is a graphical and/or textual representation of how a service or component may fail, which helps an administrator to understand the significance of various events and performance counters of the service, and efficiently decide whether to take any action based on the observed instrumentation data. A developer builds the health model 301 with the corresponding files then generated from the model and source code attribution.

The health model 301 includes a description of the component relationships, in addition to the dependencies. Depending upon the context of a detected problem, the system can walk the relationship tree and attempt to determine root cause based upon the health of other components. This approach is backed by the model and manifest utilized in accordance with the present invention.

The disclosed architecture finds application with a Service Definition Model system, various aspects thereof which are the subject of patent applications of the present assignee, the first entitled "Architecture for Distributed Computing System and Automated Design, Deployment, and Management of Distributed Applications", filed Mar. 6, 2003, and assigned U.S. provisonal application No. 60/452,736, and the second entitled "Integrating Design, Deployment, and Management Phases for an Application" filed Oct. 24, 2003 and assigned U.S. patent Ser. No. 10/693,838.

Figure 4:
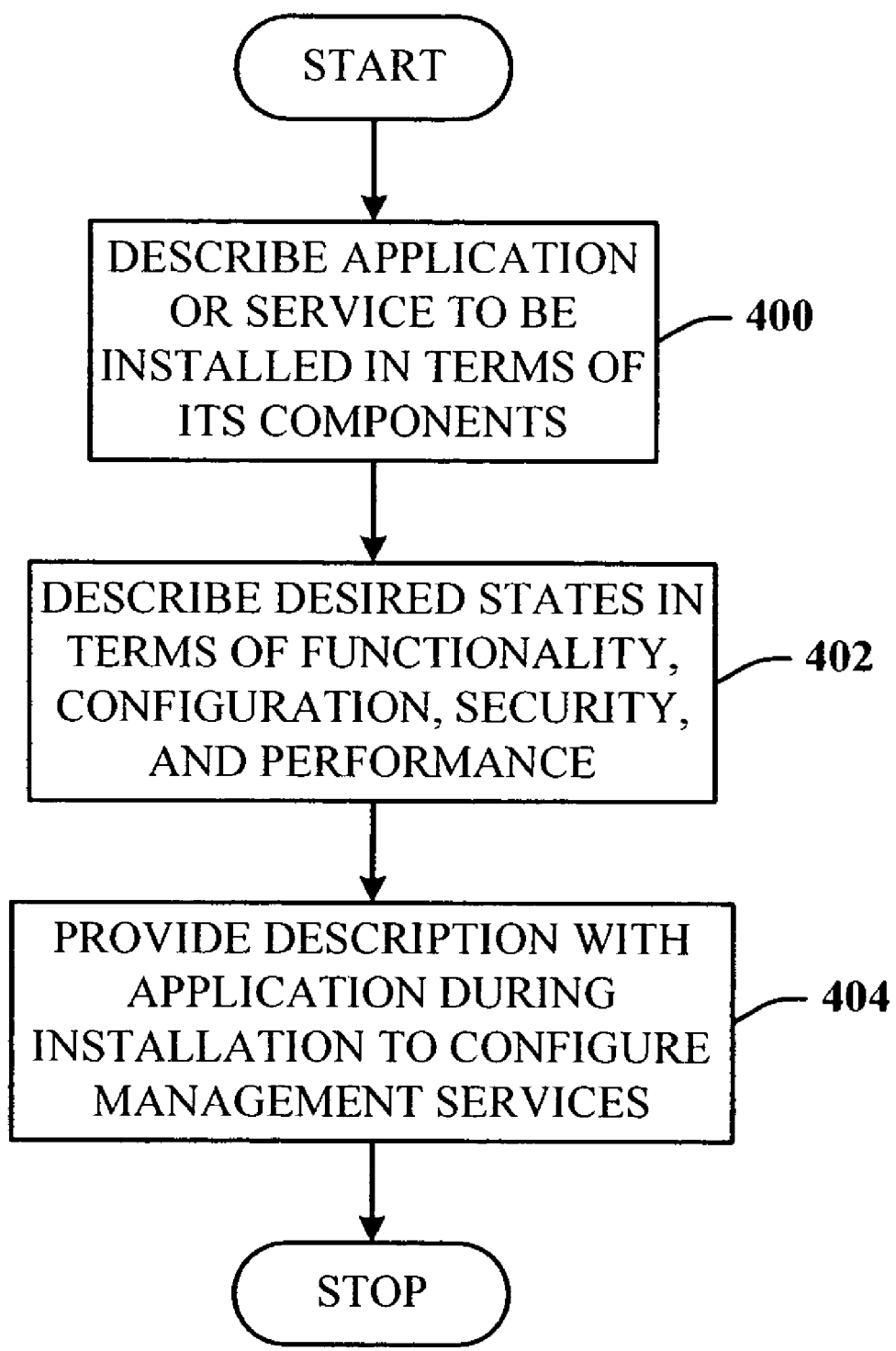
FIG. 4 illustrates a general flow chart of a process of model-based management.

Referring now to FIG. 4, there is illustrated a flow chart of a process of model-based management. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 400, the application or service to be installed is described in terms of its components. At 402, the application or service is described in the desired states in terms of functionality, configuration, security, and performance. At 404, the description is provided along with the application or service during installation, such that the description is used by the system to configure management services of the system. The process then reaches a Stop block.

Figure 5:
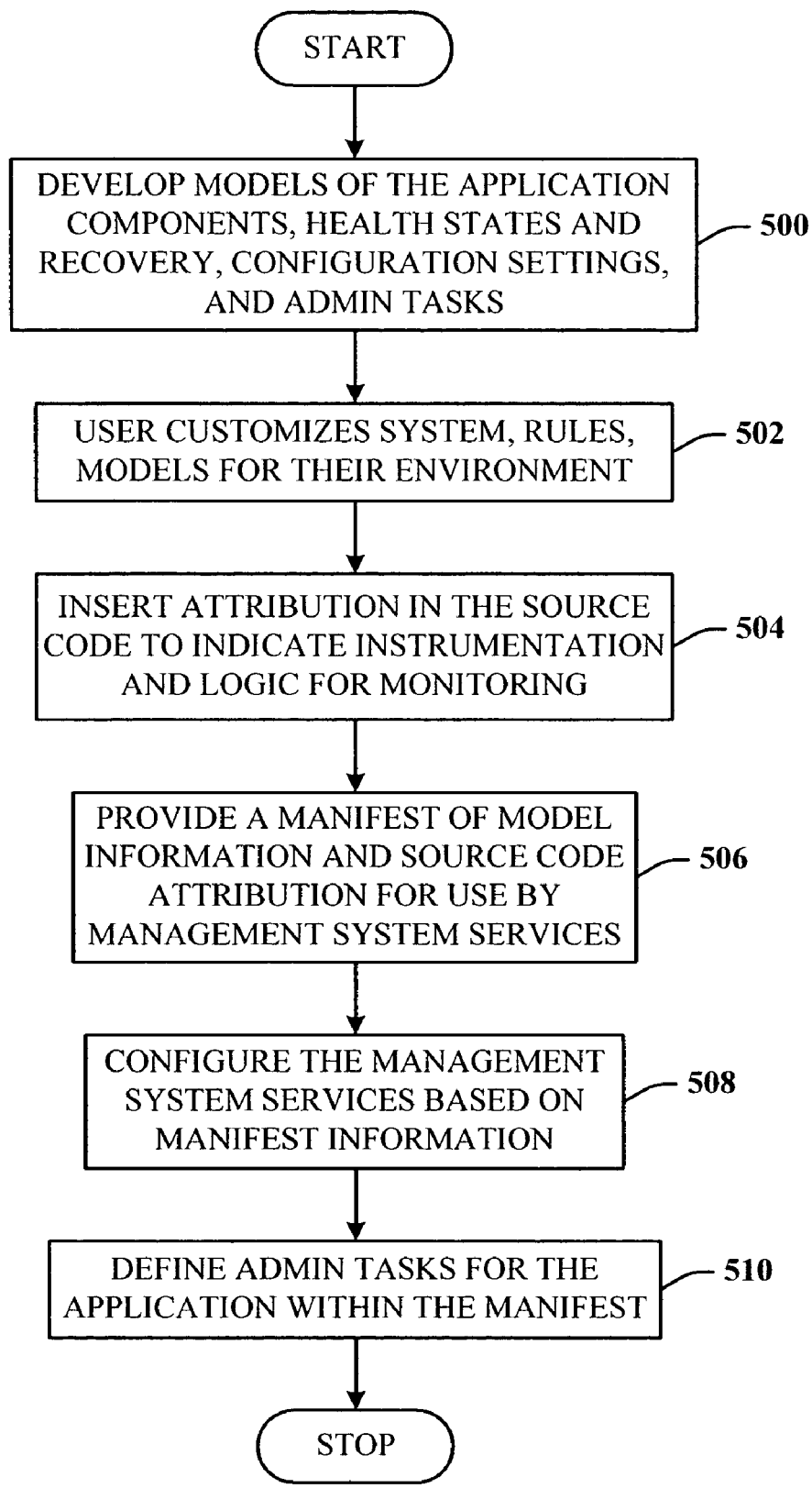
FIG. 5 illustrates a more detailed flow chart of a process of implementing the model-based management.

Referring now to FIG. 5, there is illustrated a more detailed flow chart of a process of implementing the model-based management. At 500, models are developed for the application components, health states and recovery, configuration settings, and admin tasks. At 502, a user customizes the system/rules/models according to the environment. At 504, attribution is inserted into the source code to indicate instrumentation and logic for monitoring. At 506, a manifest is provided of model information and source code attribution for use by the management system services. The manifest is provided for use by the management system services in machine-readable form. At 508, one or more of the management system services are configured based on the manifest information. At 510, administrative tasks are defined for the application within the manifest such as registering cmdlets with the system, setting up schedules, etc. The process then reaches a Stop block.

Figure 6:
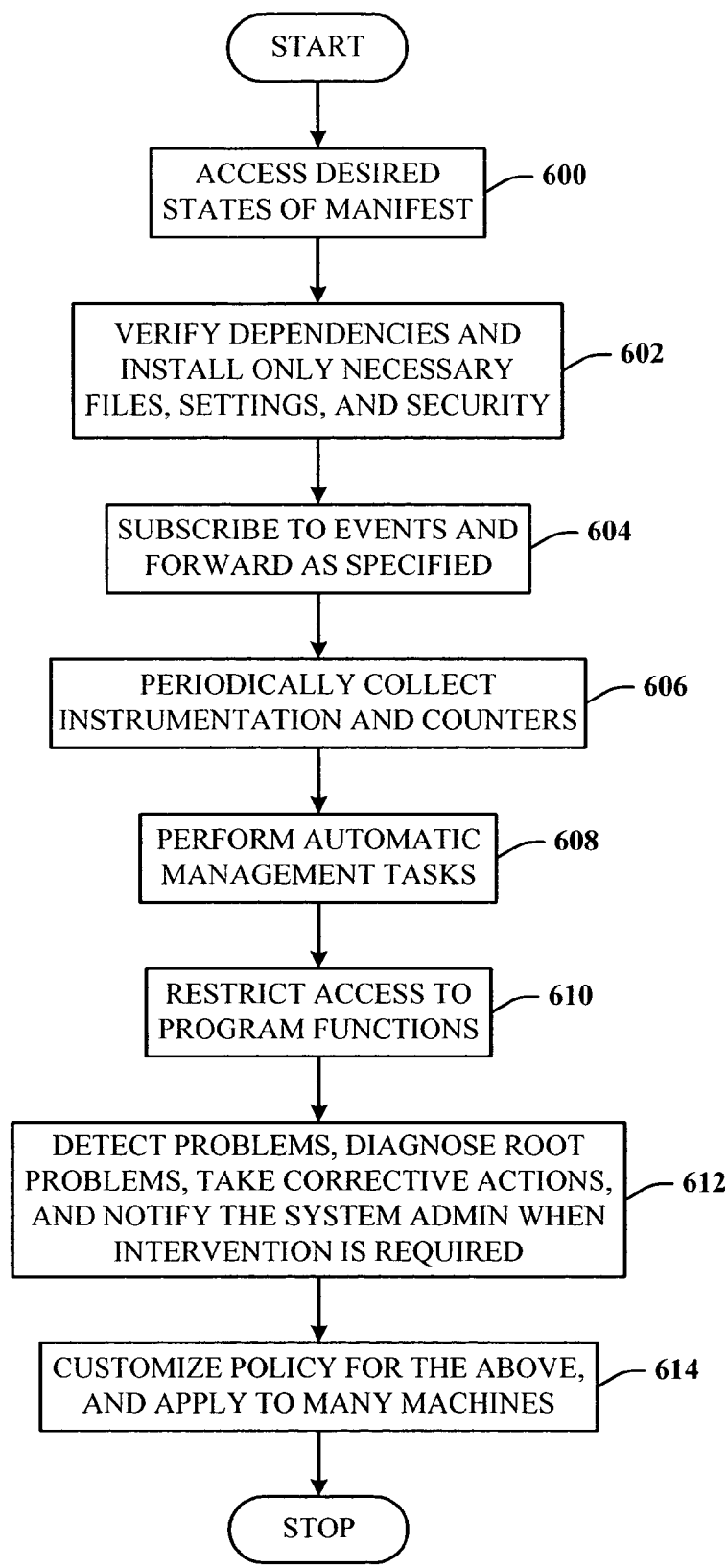
FIG. 6 illustrates a flow chart of a process of implementing desired states of the model-based management.

Referring now to FIG. 6, there is illustrated a flow chart of a process of implementing desired states of the model-based management. At 600, the desired states are accessed from the manifest. At 602, dependencies are verified and only the necessary files, settings, and security features are installed. At 604, events are subscribed to and forwarded, as specified in the manifest. At 606, instrumentation data and counter data is collected periodically, as well as tests and synthetic transactions performed. At 608, automatic management tasks are performed. At 610, access is restricted to program functions. However, this does not need to be included to facilitate model-based management in accordance with the present invention. At 612, problems are detected, root problems diagnosed, corrective actions taken, and the system administrator notified when to intervene. At 614, policies for all of the above are customized for application to many other types of machines and systems. The process then reaches a Stop block.

Figure 7:
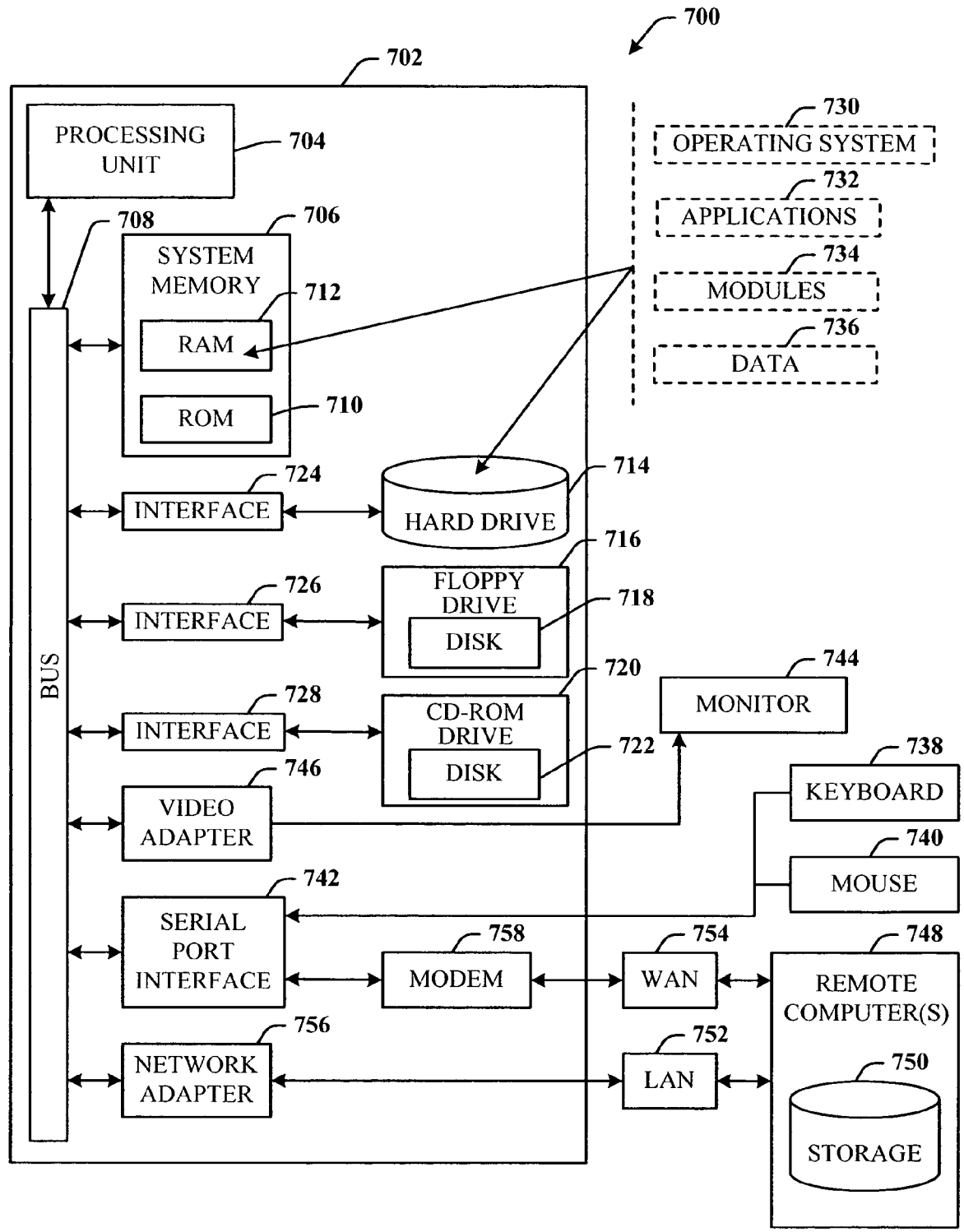
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 7, there is illustrated an exemplary environment 700 for implementing various aspects of the invention that includes a computer 702, the computer 702 including a processing unit 704, a system memory 706 and a system bus 708. The system bus 708 couples system components including, but not limited to, the system memory 706 to the processing unit 704. The processing unit 704 may be any of various commercially available processors. Dual microprocessors and other multiprocessor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes a hard disk drive 714, a magnetic disk drive 716, (e.g., to read from or write to a removable disk 718) and an optical disk drive 720, (e.g., reading a CD-ROM disk 722 or to read from or write to other high capacity optical media such as Digital Video Disk (DVD)). The hard disk drive 714, magnetic disk drive 716 and optical disk drive 720 can be connected to the system bus 708 by a hard disk drive interface 724, a magnetic disk drive interface 726 and an optical drive interface 728, respectively. The drives and their associated computer-readable media provide nonvolatile storage of data, data structures, computer-executable instructions, and so forth. For the computer 702, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 712, including an operating system 730, one or more application programs 732, other program modules 734 and program data 736. All or portions of the operating system, applications, modules, and/or data can also be cached in the RAM 712.

It is appreciated that the present invention can be implemented with various commercially available operating systems or combinations of operating systems.

A user can enter commands and information into the computer 702 through a keyboard 738 and a pointing device, such as a mouse 740. Other input devices (not shown) may include a microphone, an IR remote control, a joystick, a game pad, a satellite dish, a scanner, or the like. These and other input devices are often connected to the processing unit 704 through a serial port interface 742 that is coupled to the system bus 708, but may be connected by other interfaces, such as a parallel port, a game port, a universal serial bus ("USB"), an IR interface, etc. A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections via wired and/or wireless communications to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include a local area network (LAN) 752 and a wide area network (WAN) 754. Such networking environments are commonplace in offices, enterprise-wide computer networks, intranets and the Internet.

When used in a LAN networking environment, the computer 702 is connected to the local network 752 through a wired or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 typically includes a modem 758, or is connected to a communications server on the LAN, or has other means for establishing communications over the WAN 754, such as the Internet. The modem 758, which may be internal or external and a wired or wireless device, is connected to the system bus 708 via the serial port interface 742. In a networked environment, program modules depicted relative to the computer 702, or portions thereof, may be stored in the remote memory storage device 750. It will be appreciated that the network connections shown are exemplary and other means of establishing a communications link between the computers may be used.

The computer 702 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 8:
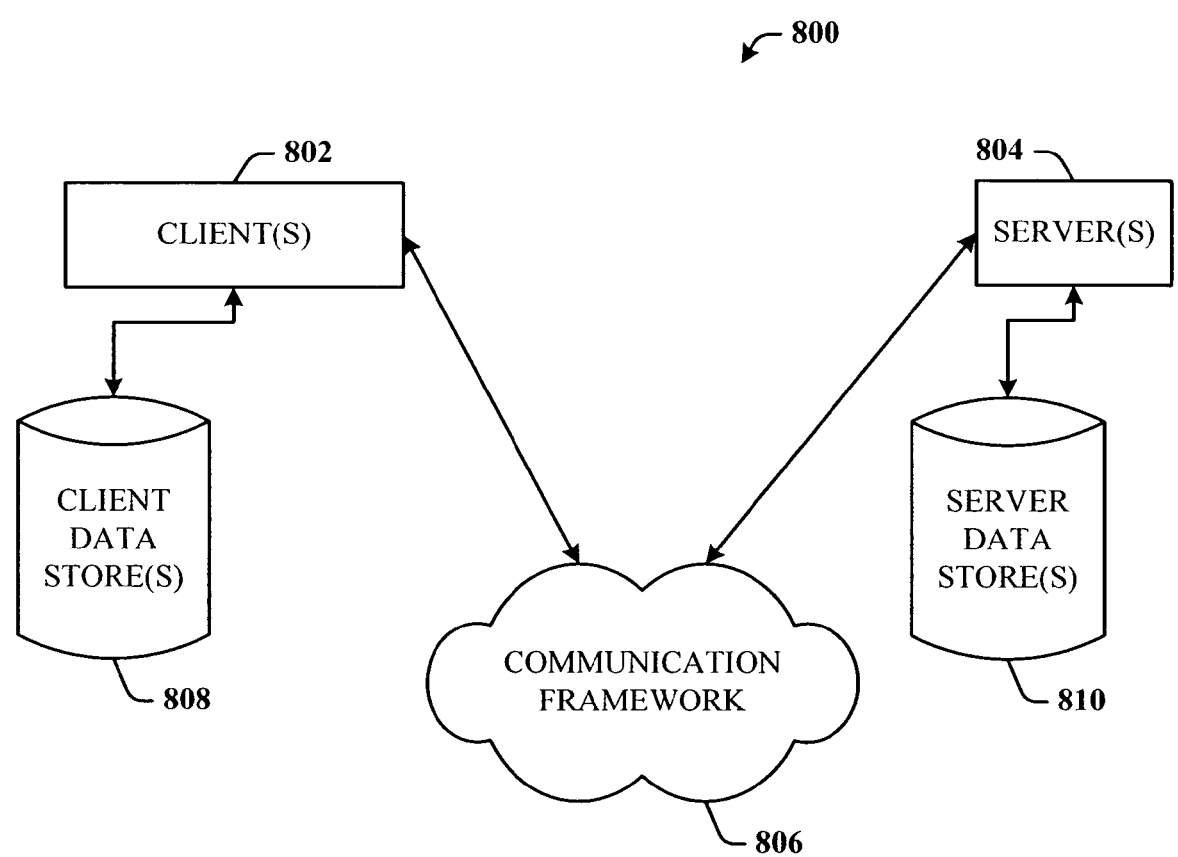
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 may be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications may be facilitated via a wired (including optical fiber) and/or wireless technology. The client(s) 802 are operably connected to one or more client data store(s) 808 that can be employed to store information local to the client(s) 802 (e.g., cookie(s) and/or associated contextual information). Similarly, the server(s) 804 are operably connected to one or more server data store(s) 810 that can be employed to store information local to the servers 804.

As indicated hereinabove, the disclosed model-based management architecture has application to enterprise-type system management. For example, one of the clients 802 can manage not only local applications or services, but also those of remote nodes, for example, the servers 804. All aspects apply to support health monitoring from a single instance of the local client to multiple instances across remote systems and applications of multiple network nodes. Machine-based learning can be employed from the local level to the enterprise level and beyond, to automate and improve system performance and capabilities.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented model-based management system for managing an application or service, comprising the following computer executable components:
    a description component that describes the application or service in terms of its constituent components, and desired states in terms of at least one of functionality, configuration, system resource utilization, security, and performance, and describes corrective actions; and
    a management service component that configures itself based at least on the description component during installation of the application or service.

2. The system of claim 1, the management service component ensures availability of the application through management actions that include at least one of configuration management problem detection, diagnosis, and recovery.

3. The system of claim 1, the description component comprises a models component that models one or more of the following: constituent components, health states and recovery, configuration settings, and administrative tasks.

4. The system of claim 1, the description component comprises a manifest component that contains information associated with models and source code attribution in a machine-readable form for use by the management service.

5. The system of claim 1, the description component comprises a management system component that comprises multiple services configured from information received from an application manifest.

6. The system of claim 1, the description component comprises an administrative tasks component that includes administrative tasks defined in an application manifest.

7. The system of claim 1, the description component comprises an attribution component that facilitates inserting attribution data in source code to indicate instrumentation and logic for monitoring aspects of the application.

8. The system of claim 1, the description component comprises a management system component that uses the desired states expressed in a manifest.

9. The system of claim 8, the management system component uses the desired states as modified by an administrator.

10. The system of claim 9, the desired states verify dependencies and install only the necessary files, settings, and security data.

11. The system of claim 9, one or more of the desired states subscribe to events and forward the events according to a predetermined specification.

12. The system of claim 9, one or more of the desired states periodically collect at least one of instrumentation data and counter data.

13. The system of claim 9, one or more of the desired states perform automatic management tasks.

14. The system of claim 9, one or more of the desired states restrict access to program functions.

15. The system of claim 9, one or more of the desired states perform at least one of detecting problems, diagnosing root causes, taking corrective action, and notifying an administrator when intervention is necessary.

16. The system of claim 9, one or more of the desired states customize policy for use with a plurality of different computers.

17. The system of claim 1, further comprising a rules definition language (RDL) that enables defining a rule for monitoring availability of software and hardware components, the RDL facilitates at least one or more of the following: problem testing, diagnosis, resolution, verification, and notification.

18. The system of claim 1, further comprising a uniform resource identifier (URI) employed to uniquely identify at least one or more of the following: abstract resource, a physical resource, and a collection of resources.

19. The system of claim 1, further comprising a URI template, which URI template allows a probe to be identified and characteristics of the probe understood without retrieving the probe.

20. The system of claim 1, further comprising an instrumentation catalog that utilizes a URI template to describe instrumentation without referring to a specific instance.

21. The system of claim 1, further comprising an attribution component that facilitates attribution of source code for monitoring health of the application.

22. The system of claim 1, further comprising an attribution component that facilitates determining which parts of source code are used to determine and/or correct health, and when to execute monitoring rules.

23. A computer implemented system of model-based management, comprising the following computer executable components:
  a description component that describes an application, service, and/or system in terms of constituent components, corrective actions and desired states, the constituent components include at least one or more of the following:
    a model component that further includes at least one of a component model, a health model, a configuration model, an administrative task model, an architecture model, a performance model, and a security model;
    a manifest component generated from at least one of the model components that includes constituent component information and attribution of source code of one of the model components;
    a management system component that includes one or more application program interfaces (APIs) that interface with the application, service or system; and
    a tasks component; and
  a management service component that configure itself based at least on the description component during installation of the application, service and/or system.

24. The system of claim 23, the APIs facilitate at least one or more of the following: central configuration, role-based access, system monitoring, manifest storing and editing, event generation and logging, instrumentation, performance counter processing, local configuration, installation, automation, and task scheduling.

25. A computer-readable medium having computer-executable instructions that embodies the system of claim 23, the tasks component further defines at least one of monitoring tasks, troubleshooting tasks, and administrative tasks for performance by the model-based management system.

26. A method of model-based management for managing an application, comprising:
  developing one or more models corresponding to components of the application, using a source code;
  performing attribution of the source code to indicate what models or portions thereof will be monitored;
  generating a manifest of manifest information corresponding to the modeled application components and source code attribution while installing the application, the manifest information for use by a management system service;
  configuring a plurality of the management system services based on the manifest information; and
  expressing desired states and corrective actions in the manifest.

27. The method of claim 26, further comprising verifying dependencies and installing only at least one of necessary files, settings and security based on one or more of the desired states.

28. The method of claim 26, further comprising subscribing to events and forwarding the events according to a predetermined event specification based on one or more of the desired states.

29. The method of claim 26, further comprising polling instrumentation by periodically collecting instrumentation information, counter information, and tests based on one or more of the desired states.

30. The method of claim 26, further comprising performing automatic management tasks based on one or more of the desired states.

31. The method of claim 26, further comprising restricting access to program functions based on one or more of the desired states.

32. The method of claim 26, further comprising monitoring system processes based on the desired states by detecting problems, diagnosing root causes, taking corrective actions, and notifying a system administrator when, intervention is required.

33. The method of claim 26, further comprising customizing policies and applying the customized policies to different computers to facilitate problem testing, diagnosis, resolution, verification, and notification.

34. The method of claim 26, further comprising:
  determining one or more health states of a service;
  publishing instrumentation of the application;
  analyzing the published instrumentation; and
  developing a health model of the service based on the published instrumentation, wherein the health model includes relationship information between components.

35. A computer implemented model-based management system for managing an application or service, comprising;
  means for describing the application or service in terms of its constituent components, corrective actions and desired states in terms of at least one or more of the following: functionality, configuration, security, and performance;
  means for expressing management information along with source code of the application to facilitate determining health of the application;
  means for identifying abstract or physical resources using a Uniform Resouce Identifier(URI); and
  means for configuring a management service component based in part on constituent components during installation of the application to configure the management service component.

36. The system of claim 35, the application or service is distributed.

37. A computer-readable medium having computer-executable instructions for performing a method of managing an application or service, the method comprising:
  developing one or more models corresponding to components of the application, using a source code;
  performing attribution of the source code to indicate what models or portions thereof will be monitored;
  generating a manifest of manifest information corresponding to the modeled application components and source code attribution while installing the application, the manifest information for use by a management system service;

configuring a plurality of the management system services based on the manifest information; and expressing desired states and corrective actions in the manifest.

38. The computer-readable medium of claim 37, further comprising verifying dependencies and installing only at least one of necessary files, settings and security based on one or more of the desired states.

39. A computer-readable medium having computer-executable instructions that facilitates a model-based management system for managing an application or service, the system comprising:

a description component that describes the application or service in terms of its constituent components, corrective actions and desired states in terms of at least one or more of the following: functionality, configuration, system resource utilization, security, and performance; and a management service component that uses the description component during installation of the application or service to configure itself.

* * * * *